(12) United States Patent
Balasubramanian et al.

(10) Patent No.: US 9,225,691 B1
(45) Date of Patent: Dec. 29, 2015

(54) DEDUPLICATION OF ENCRYPTED DATASET ON DATADOMAIN BACKUP APPLIANCE

(71) Applicant: EMC Corporation, Hopkinton, MA (US)

(72) Inventors: Shankar Balasubramanian, Bangalore (IN); Abhinav Duggal, Delhi (IN); Bharath Krishnappa, Bangalore (IN); Ravi Sharda, Bangalore (IN)

(73) Assignee: EMC Corporation, Hopkinton, MA (US)

(*) Notice: Subject to any disclaimer, the term of this patent is extended or adjusted under 35 U.S.C. 154(b) by 161 days.

(21) Appl. No.: 14/040,407

(22) Filed: Sep. 27, 2013

(51) Int. Cl.
*H04L 29/06* (2006.01)
*G06F 13/00* (2006.01)
*G06F 21/00* (2013.01)
*G06F 13/28* (2006.01)
*G06F 21/62* (2013.01)
*H04L 9/32* (2006.01)

(52) U.S. Cl.
CPC ............ *H04L 63/0428* (2013.01); *G06F 13/00* (2013.01); *G06F 13/28* (2013.01); *G06F 21/00* (2013.01); *G06F 21/6218* (2013.01); *H04L 9/3236* (2013.01); *H04L 2209/603* (2013.01)

(58) Field of Classification Search
CPC ......... G06F 13/00; G06F 21/00; G06F 13/28; G06F 21/6218; G06F 21/6272; G06F 2221/2107; G06F 17/30156; G06F 21/64; G06F 11/1464; G06F 2211/1028; G06F 11/1076; H04L 63/0428; H04L 9/3236; H04L 2209/34; H04L 2209/603
See application file for complete search history.

(56) References Cited

U.S. PATENT DOCUMENTS

| | | | |
|---|---|---|---|
| 8,266,430 B1 * | 9/2012 | Lumb | 713/165 |
| 8,751,828 B1 * | 6/2014 | Raizen et al. | 713/193 |
| 2011/0246741 A1 * | 10/2011 | Raymond et al. | 711/170 |
| 2012/0159175 A1 * | 6/2012 | Yocom-Piatt et al. | 713/176 |
| 2013/0036277 A1 * | 2/2013 | Szczepkowski et al. | 711/159 |
| 2014/0019497 A1 * | 1/2014 | Cidon et al. | 707/827 |
| 2014/0304526 A1 * | 10/2014 | Grube et al. | 713/193 |

* cited by examiner

*Primary Examiner* — Mohammad A Siddiqi
(74) *Attorney, Agent, or Firm* — Blakely, Sokoloff, Taylor & Zafman LLP

(57) ABSTRACT

Exemplary methods for deduplicating encrypted files are described herein. The exemplary methods include receiving a first encrypted data file from a remote source that is encrypted by a first security key. In one embodiment, the methods include transmitting to a remote security manager a first key identifier (ID) that is extracted from the first data file, the first key ID identifying the first security key. In one aspect of the invention, in response to receiving the first security key from the remote security manager based on the first key ID, decrypting the first data file using the first security key provided by the remote security manager. In at least one embodiment, the methods include deduplicating the decrypted first data file.

18 Claims, 14 Drawing Sheets

| Key ID 203 | Seed 204 |
|---|---|
| Key ID 1 | Seed 1 |
| ... | ... |
| Key ID *n* | Seed *n* |

Security Information 214

FIG. 2

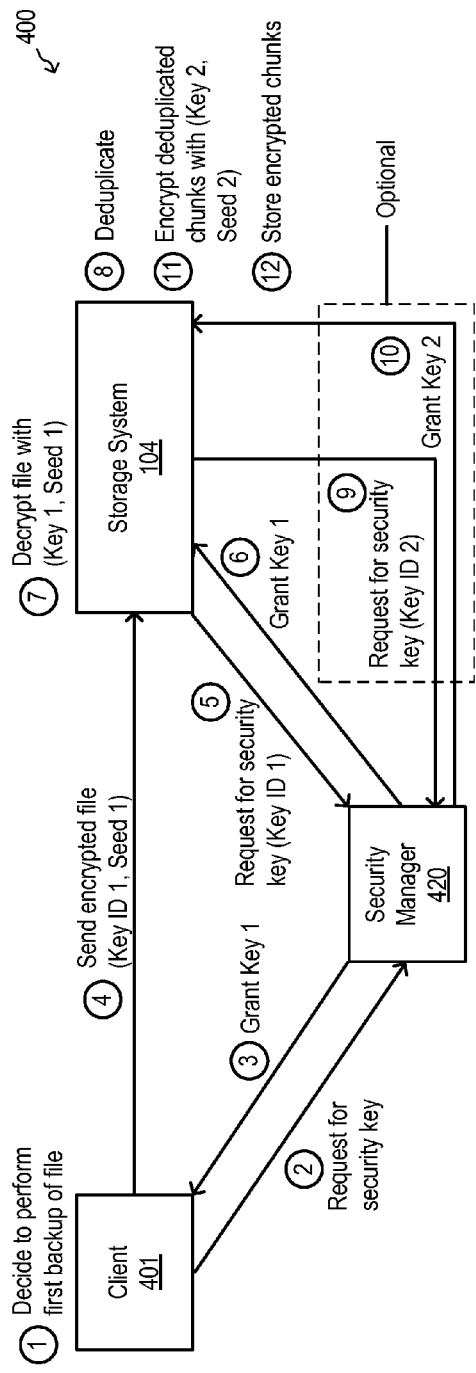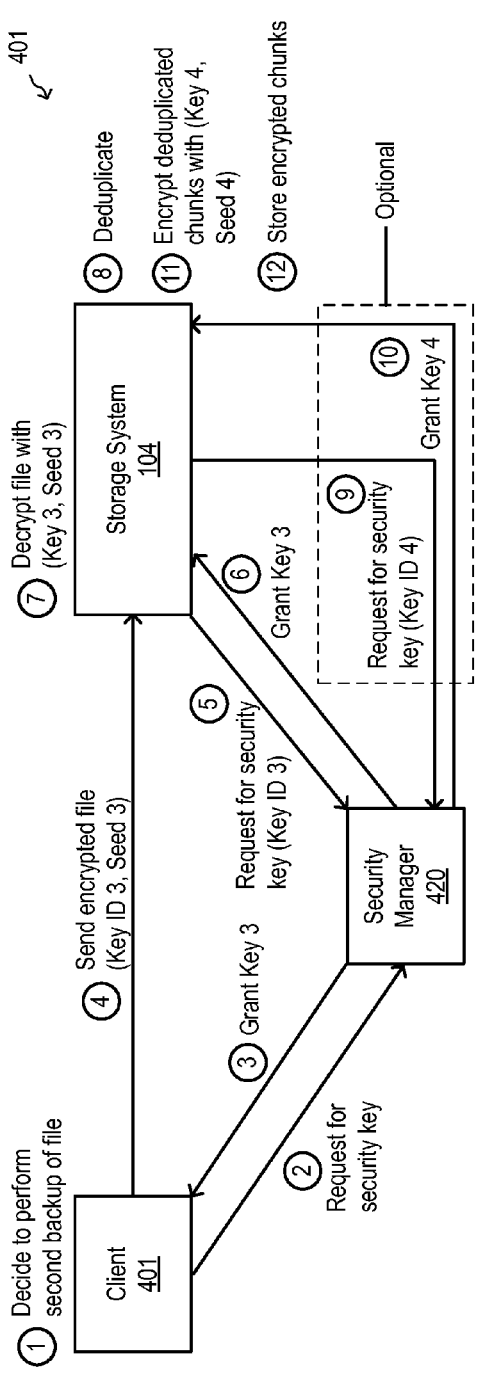

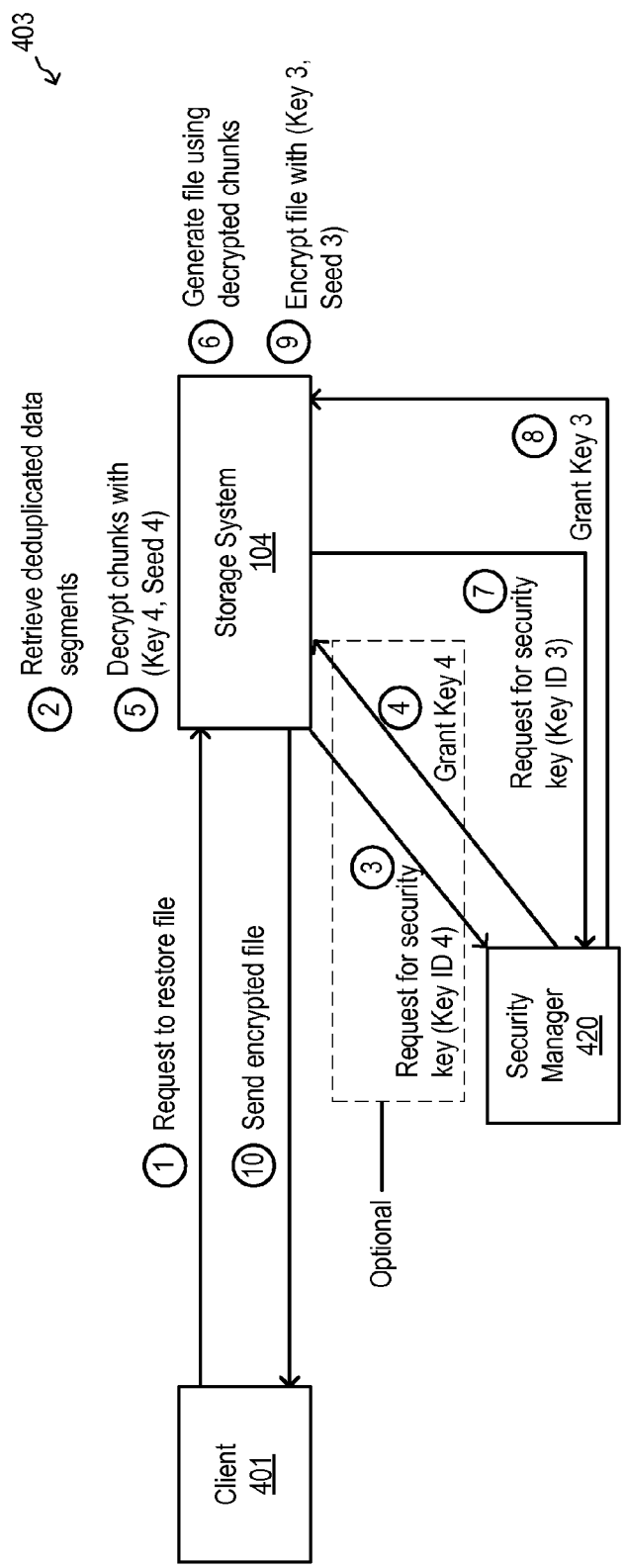

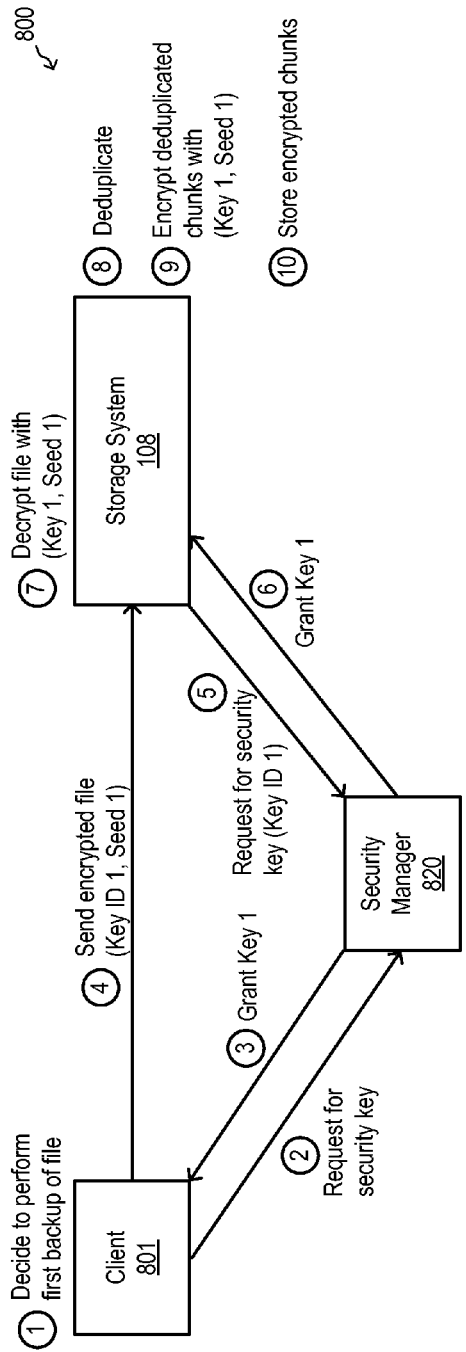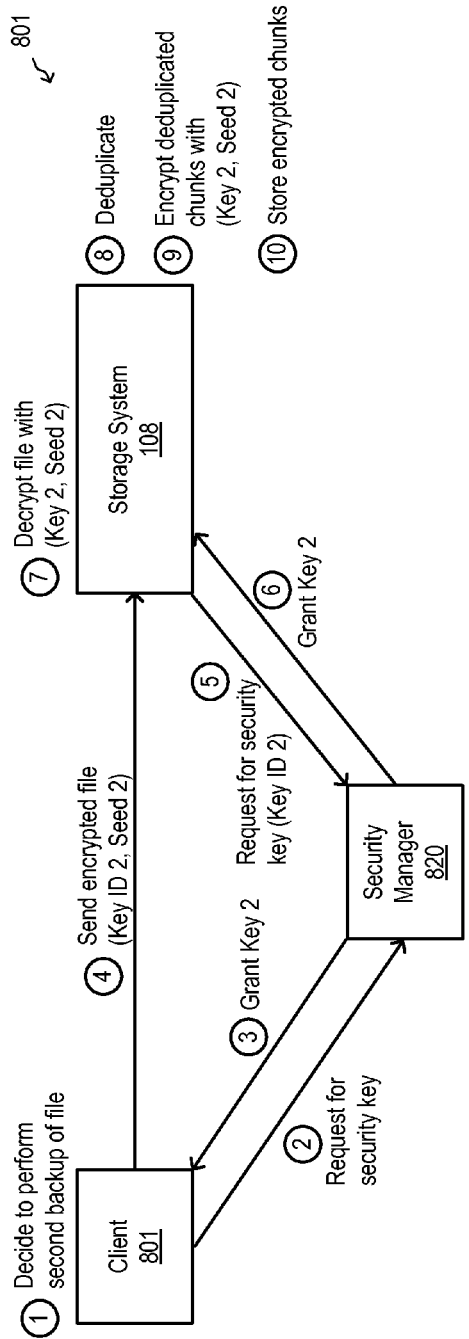

DEDUPLICATION OF ENCRYPTED DATASET ON DATADOMAIN BACKUP APPLIANCE

FIELD OF THE INVENTION

Embodiments of the present invention relate generally to data storage systems. More particularly, embodiments of the invention relate to deduplication of encrypted dataset.

BACKGROUND

Data storage utilization is continually increasing, causing the proliferation of storage systems in data centers. In particular, the size of the applications and the data generated therefrom is increasing. Moreover, systems/users are backing up multiple copies of a given set of data to maintain multiple versions. For example, snapshots of a given database stored in a server are copied and stored over time, thereby allowing a given version/snapshot of a set of data to be restored. Typically, much of the data remains the same across different snapshots. For example, if the data is backed up for a given user on a daily basis and such user is updating only one of the number of files for a given day, the data in this file is the only data that has been modified. Accordingly, conventional backup operations include the deduplication of backup data.

Conventionally, data received at a backup storage system (such as a deduplicating storage system available from EMC® Corporation of Hopkinton, Mass.) is deduplicated by eliminating duplicate chunks across multiple backups. In some instances, the data arrives at the backup storage system encrypted. Data is encrypted by the customer for various reasons, including for example, security and compliance. Conventional deduplicating backup storage systems cannot find redundant chunks across multiple backups even for the same backup file because different instances of these backups might be encrypted differently (e.g., using different encryption algorithms, keys, seeds, etc.). Even if the encrypted data is a small fraction of all the data being backed up, the storage usage on a backup appliance can grow very quickly, and the result is inefficient use of storage.

In order to avoid inefficient use of backup storage capacity, users/customers are currently required to decrypt the data before it is sent to a backup storage appliance. Such a solution, however, exposes the customer to the potential for a security breach, e.g., sensitive data may be exposed to users that are not privileged to access the data.

BRIEF DESCRIPTION OF THE DRAWINGS

Embodiments of the invention are illustrated by way of example, and not as limitations, in the figures of the accompanying drawings in which like references indicate similar elements.

FIG. 2 is a block diagram illustrating a security information structure according to one embodiment.

FIG. 4A is a block diagram illustrating a storage system according to one embodiment.

FIG. 4B is a block diagram illustrating a storage system according to one embodiment.

FIG. 4C is a block diagram illustrating a storage system according to one embodiment.

FIG. 8A is a block diagram illustrating a storage system according to one embodiment.

FIG. 8B is a block diagram illustrating a storage system according to one embodiment.

DETAILED DESCRIPTION

Figure 1:
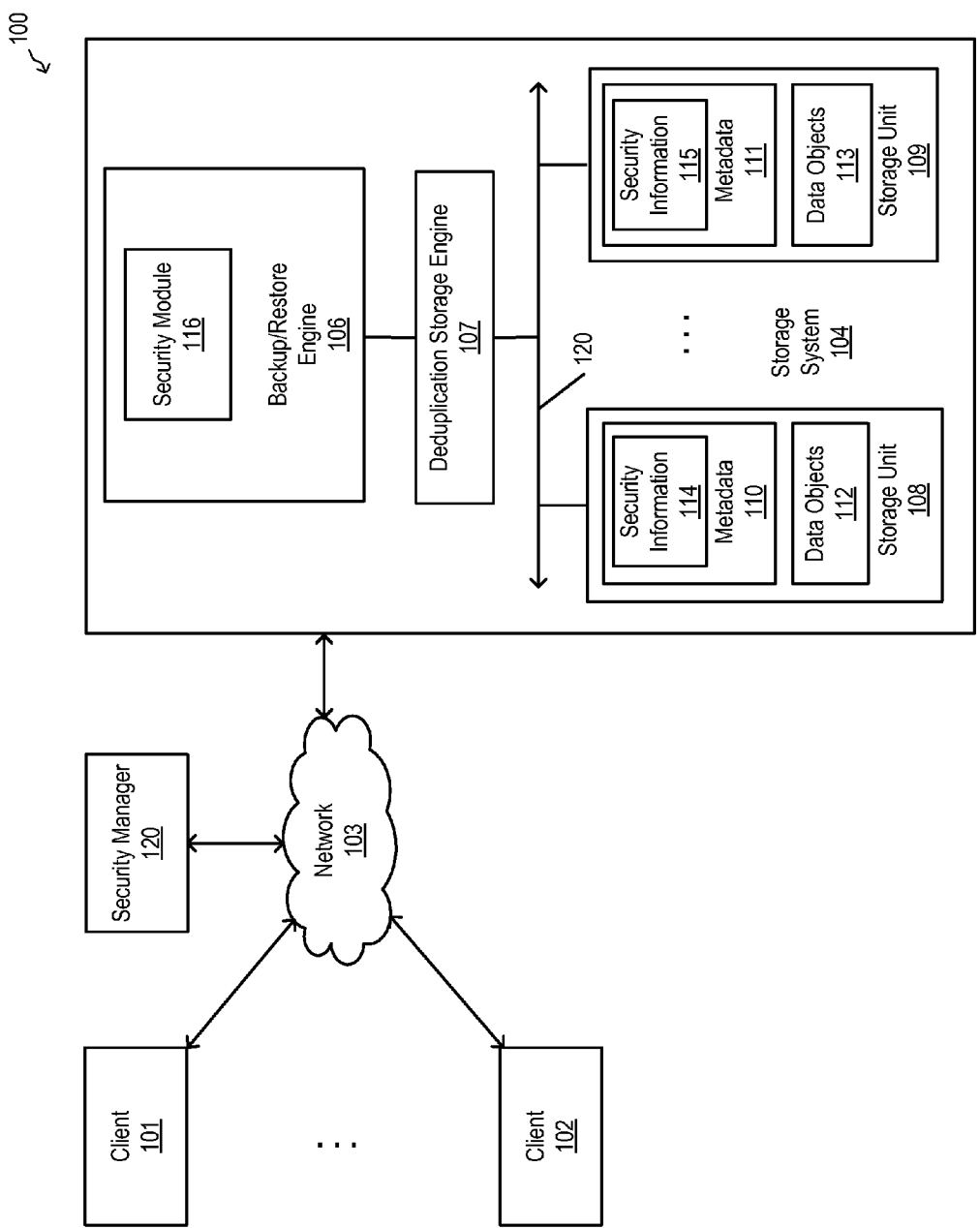
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A deduplicating storage system receives data to be backed up. In order to increase the efficient use of the storage system, the backup data is deduplicated by the storage system. As used herein, deduplicating refers to the partitioning of the backup data (e.g., a file) into multiple data segments. Typically, a hash is then generated for each of the data segments, and compared against hashes of the data segments currently stored at the storage system. Only data segments with hashes that do not match hashes currently stored on the storage system are stored. Data segments with hashes that match those currently stored at the storage system are not stored. Rather, references are made to the existing data segments on disk that correspond to the matching hashes. Thus, deduplication reduces storage usage by not storing multiple copies of the same data. Deduplication, however, relies on hashes of incoming (new) backup data to be able to match up with existing hashes when the incoming and existing data segments are the same. In the case of encrypted backup data, however, hashes of the incoming and existing data segments do not match, even if they are the same data. This may be due to various reasons, e.g., each backup of the data may be employing a different encryption algorithm, key, seed, etc. Embodiments of the present invention overcome this limitation by decrypting the incoming data prior to deduplication. By decrypting the incoming data prior to deduplication, the same data segments will have the same hashes, even if they arrive at the backup storage system encrypted using different encryption algorithms, keys, seeds, etc.

According to some embodiments, in response to receiving encrypted backup data, a security module at a deduplicating storage system examines the received encrypted data to determine a key identifier (ID) that is associated with the encrypted data. In such an embodiment, the security module requests a remote security manager for a security key corresponding to the key ID. Further, the security module uses the security key received from the remote security manager to decrypt the encrypted backup data. Various embodiments of the present storage system include a deduplication storage engine configured to deduplicate the decrypted backup data. According to one embodiment, the deduplicated backup data is then stored at the storage system. In at least one embodiment, the deduplicated backup data is re-encrypted prior to being stored on the storage system. In one embodiment, the security key used for re-encrypting the deduplicated data segments is the same security key that is used to decrypt the incoming backup data. In an alternate embodiment, the security keys can be different. In such an embodiment, the security key for re-encrypting the deduplicated data segments can be stored locally. Alternatively, the security key can be stored at a remote security server. In such an embodiment, the storage system provides a key ID as part of a request for the security key to re-encrypt the deduplicated data segments.

According to some embodiments, in response to receiving a request from a remote backup client to restore backup data (e.g., a file) stored at the storage system, the deduplication storage engine generates the requested data using data segments stored at the storage system. In at least one embodiment, the data segments are decrypted prior to being used to generate the requested data. In one embodiment, the security key for decrypting the data segments is stored locally. In an alternate embodiment, the security key is stored at a remote security server. In such an embodiment, the storage system provides a key ID as part of a request for the security key to decrypt the deduplicated data segments. The security module then re-encrypts the generated data and sends the encrypted data to the remote client that requested the backup data. In one embodiment, the security key for decrypting the deduplicated data segments is the same security key for re-encrypting the generated data file. Alternatively, the security keys can be different. In such an embodiment, the storage system requests a remote security server for a security key to re-encrypt the generated data by providing the remote security server with a key ID that identifies the security key. In one embodiment, the key ID that identifies the security key for re-encrypting the generated data file is the same key ID that was included as part of the incoming encrypted file. Various embodiments will now be discussed with reference to various figures.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup/restore engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be a combination of such devices. In the case of disk storage media, the storage units 108-109 may be organized into one or more volumes of Redundant Array of Inexpensive Disks (RAID).

In one embodiment, storage system 104 includes security module 116, which can be implemented as software, firmware, hardware, or any combination thereof. In response to a data file to be backed up in storage units 108-109, security module 116 is configured to determine if the data file is encrypted. Throughout the description, the received data file to be backed up is interchangeably referred to as a "backup" or "incoming" data/file.

In one embodiment, security module 116 is configured to process/parse the incoming data in order to determine a key ID and seed for the encrypted incoming data. In one embodiment, security module 116 is configured to store the key IDs and seeds as part of security information 114-115, which are stored as part of metadata 110-111. Throughout the description, security information for encrypting and decrypting data are described as including a key ID and seed. It will be appreciated that the present invention is not so limited. For example, security module 116 can be extended to parse incoming files for any security information necessary for decrypting the incoming data, and storing such information as part of security information 114-115.

In one embodiment, in order to improve deduplication performance, security module 116 is configured to decrypt each of the encrypted incoming file prior to deduplication. In such an embodiment, security module 116 requests a remote security server (e.g., security manager 120) for a security key that is associated with the encrypted incoming file. The remote security server may be a trusted third-party security service provider (e.g., RSA key providers) that is agreed upon by clients 101-102 and storage system 104. Once the security key is received, security module 116 decrypts each of the encrypted incoming data.

In response to a data file to be stored in storage units 108-109, deduplication storage engine 107 is configured to segment the data file (which may have been decrypted by security module 116) into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a CR of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects). According to one embodiment, metadata 110-111 further includes security information 114-115, respectively, for decrypting incoming data and encrypting outgoing data (discussed in further details below).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

In one embodiment, the deduplicated data segments of the incoming file are re-encrypted prior to being stored on storage units 108-109. By re-encrypting the deduplicated data segments, storage system 104 provides the customer/client with the advantage of deduplication (i.e., efficient usage of the storage system), without exposing the client to a potential security breach. In one embodiment, security module 116 re-encrypts the deduplicated segments using a security key that is the same as the security key for decrypting the incoming file. In this embodiment, the encrypted deduplicated segments may not be sharable amongst different clients, because the keys for encrypting them are different, which requires more storage space. In an alternate embodiment, the security keys can be different. That is, there are two keys involved in this embodiment for each client: 1) a first key that used by both the client and the storage system to decrypt the incoming non-duplicated data and 2) a second key solely used by the storage system for encrypting the deduplicated segments. The first key may be maintained and retrieve from a remote security manager that is agreed upon by the client and the storage system. Different clients may be associated with the same or different remote security managers dependent upon the specific configurations, which may be identified and determined from one data stream from another. The second key is not exposed to any client or entity outside of the storage system. The first key is client or stream/client specific, while the second key is used to encrypt the deduplicated segments for multiple clients. In this situation, less storage space may be utilized amongst different clients with different encryption keys. In such an embodiment, the security key for re-encrypting the deduplicated data segments can be maintained locally by security module 116. Alternatively, the security key for encrypting the deduplicated segments can be maintained by a remote security server (e.g., security manager 120).

In one embodiment, backup/restore engine 106 is configured to receive requests from clients (such as clients 101-102) to restore backup files that were previously stored in storage units 108-109. In such an embodiment, backup/restore engine 106 is configured to generate the requested files from data chunks using metadata 110-111. Throughout the description, the requested files are interchangeably referred to as "outgoing" data/files.

In response to the request to restore a backup file, security module 116 is configured to determine whether the stored data segments are encrypted. In response to determining the data segments are encrypted, security module 116 decrypts the data segments using a security key. In one embodiment, the security key for decrypting the data segments is maintained locally. Alternatively, the security key for decrypting the data segments can be maintained by a remote security server, such as security manager 120.

Once the data segments are decrypted and linked together to generate the requested file, security module 116 determines if the generated file should be encrypted prior to being sent to the requesting remote client. For example, if the original incoming file was encrypted when it was received by storage system 104, then the restored outgoing file should be re-encrypted using a similar encryption algorithm, key, seed, etc. In one embodiment, security module 116 determines the key ID and seed by looking up an entry in security information 114-115 corresponding to the requested file. According to one embodiment, once the key ID has been identified, security module 116 requests a security server (e.g., security manager 120) for a security key corresponding to the determined key ID. Security module 116 is further configured to encrypt the outgoing file using the security key provided by the security server and the seed accessed from security information 114-115.

FIG. 2 is a block diagram illustrating security information 214 according to one embodiment. For example, security information 214 can be implemented as part of security information 114 and/or security information 115. In the illustrated embodiment, for each encrypted incoming file, security information 214 includes an entry that maps a key ID and a seed to the encrypted incoming file. For example, each entry includes, but is not limited to, key ID field 203 for storing the key ID associated with the encrypted incoming file. Security information 214 further includes seed field 204 for storing the seed of the encrypted incoming file.

Figure 3A:
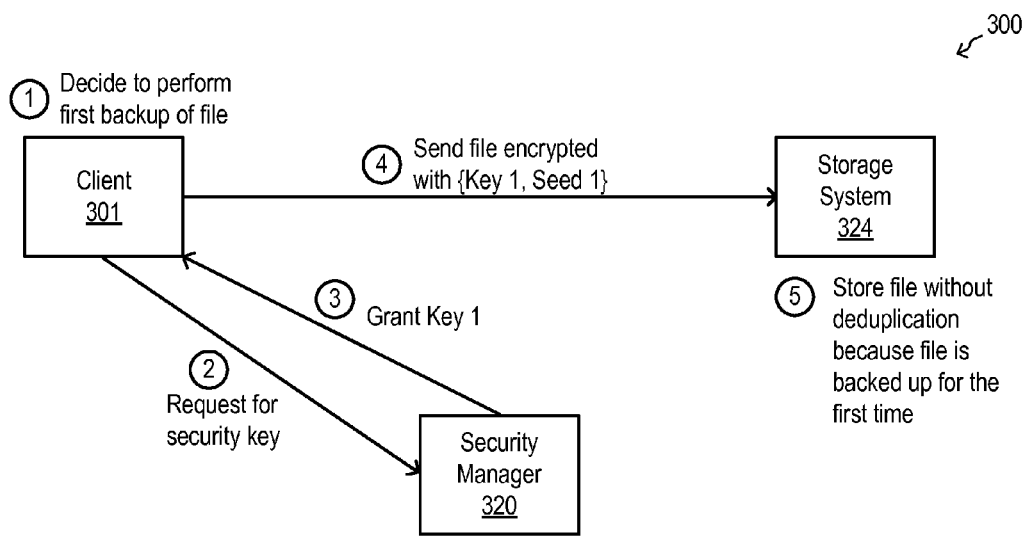
FIG. 3A is a block diagram illustrating a conventional storage system.
Figure 3B:
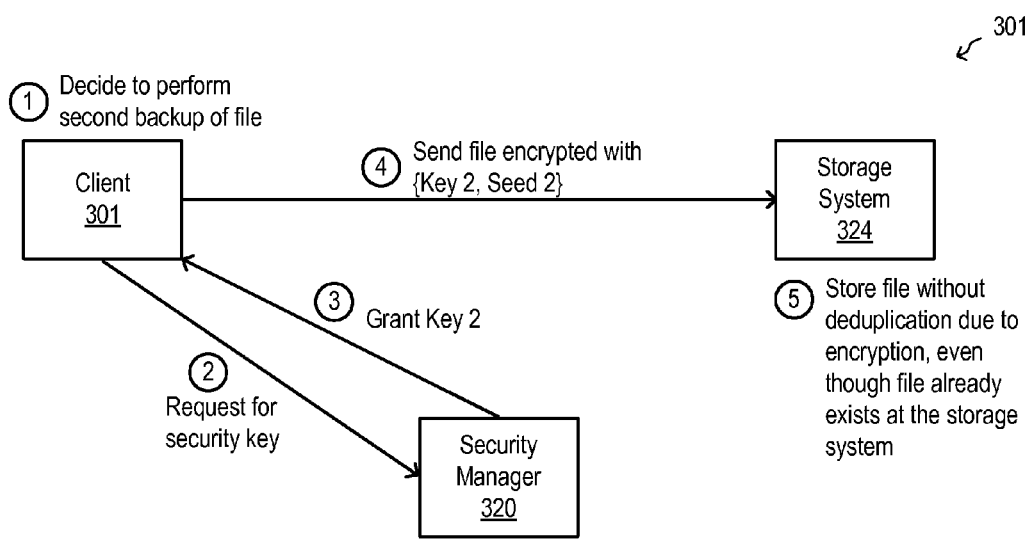
FIG. 3B is a block diagram illustrating a conventional storage system.

FIGS. 3A and 3B are block diagrams illustrating conventional storage systems 300 and 301, respectively. Systems 300-301 include storage system 324 communicatively coupled to client 301, which is communicatively coupled to security manager 320. FIGS. 3A and 3B illustrate the same file being backed up twice to storage system 324. The first backup is performed during the transactions illustrated in FIG. 3A, and the second backup of the same file is performed during the transactions illustrated in FIG. 3B.

Referring now to FIG. 3A, which illustrates the transactions that are performed by conventional storage system 324 when backing up a data file. At transaction 1, client 301 decides to perform a first backup of a file. At transaction 2, client 301 decides to encrypt the backup file, and sends a request to security manager 320 for a security key. At transaction 3, security manager 320 sends key 1 to client 301. At transaction 4, client 301 encrypts the backup file with key 1 and seed 1, and sends the encrypted file to storage system 324. At transaction 5, in response to the backup file, conventional storage system 324 attempts to deduplicate the encrypted backup file in order to reduce usage of the storage system. Conventional storage system 324 fails, however, to deduplicate the backup file because the file is being backed up for the very first time.

FIG. 3B illustrates the transactions that are performed by conventional storage system 324 when backing up the same data file that has been previously backed up, for example, as part of the transactions illustrated in FIG. 3A. At transaction 1, client 301 decides to perform a second backup the same file that was previously backed up during the transactions described in FIG. 3A. At transaction 2, client 301 decides to encrypt the backup file and requests security manager 320 for a security key to encrypt the same backup file. At transaction 3, security manager 320 grants key 2 to client 301. Note that this security key is different from the security key that was used to encrypt the file during its first backup. At transaction 4, client 301 encrypts the same backup file with key 2 and seed 2, and sends the encrypted file to conventional storage system 324. Although the backup file in FIG. 3A is the same as the backup file in FIG. 3B, the files that arrive at storage system 324 during the first and second backup are different because they have been encrypted using different security keys and seeds.

At transaction 5, in response to receiving the backup file, conventional storage system 324 attempts to deduplicate the encrypted backup file. Conventional storage system 324 fails, however, to deduplicate because the data segments of the backup file are different from the data segments that were previously backed up in FIG. 3A. Again, the data segments are different even though the two backup files are the same (or mostly the same) due to the fact that the files have been encrypted using different security keys and seeds. Different data segments result in different hashes, and thus, deduplication is not possible because the hashes of the data segments do not match. Therefore, conventional storage system 324 stores the entire backup file again without any deduplication. As a result, two exact copies of the same file have been stored on disk. Embodiments of the present invention overcome this limitation by decrypting the backup file prior to deduplication. Details are discussed with respect the figures below.

FIGS. 4A-4B are block diagrams illustrating storage systems 400-401, respectively, according to one embodiment. Systems 400-401 include storage system 104 communicatively coupled to client 401, which is communicatively coupled to security manager 420. FIGS. 4A-4B illustrate the same file being backed up twice to storage system 104. The first backup is performed during the transactions illustrated in FIG. 4A, and the second backup of the same file is performed during the transactions illustrated in FIG. 4B.

Referring now to FIG. 4A, which illustrates the transactions that are performed by storage system 104 when backing up a data file, according to one embodiment. At transaction 1, client 401 decides to perform a first backup of a file. At transaction 2, client 401 decides to encrypt the backup file, and sends a request to security manager 420 for a security key. At transaction 3, security manager 420 sends key 1 to client 401. At transaction 4, client 401 encrypts the backup file using key 1 and seed 1, and sends the encrypted file to storage system 104.

Figure 5:
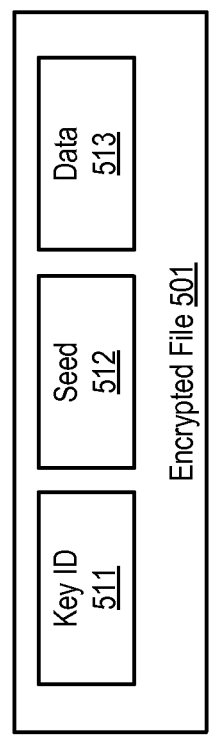
FIG. 5 is a block diagram illustrating an encrypted file according to one embodiment.

In one embodiment, the encrypted file includes the data to be backed up and a corresponding key ID and seed that were used to encrypt the data. FIG. 5 illustrates encrypted file 501 according to one embodiment. As illustrated, encrypted file 501 includes data 513 which represents the encrypted data that is to be backed up. Encrypted file 501 further includes key ID 511 and seed 512 that were used by the backup client in encrypting data 513.

Referring now back to FIG. 4A. At transaction 5, in response to receiving the backup file, storage system 104 (e.g., security module 116 of storage system 104) determines that the backup file is encrypted, and parses the file to access the key ID and seed of the encrypted file. For example, storage system 104 parses the received encrypted file and accesses key ID 1 and seed 1. Storage system 104 then sends a request to security manager 420 for a security key to decrypt the backup file. In one embodiment, storage system 104 sends the key ID corresponding to the encrypted data as part of the request. For example, as illustrated, storage system 104 sends key ID 1 which identifies key 1 that was used to encrypt the backup file.

At transaction 6, security manager 420 uses the received key ID to identify the security key that was used to encrypt the encrypted data, and sends the identified security key to storage system 104. As illustrated, security manager 420 sends key 1 to storage system 104. At transaction 7, security module 116 uses the received security key and seed (e.g., key 1 and seed 1) to decrypt the encrypted encrypted file.

In one embodiment, storage system 104 stores the key ID and seed that are accessed from the received encrypted file as part of security information 214. For example, received key ID 1 may be stored as part of key ID field 203 and received seed 1 may be stored as part of seed field 204. The information stored in security information 214 is used by storage system 104 for restoring the backup files when requested by the backup client, which is discussed in further details below.

At transaction 8, storage system 104 deduplicates the decrypted incoming file. By decrypting the incoming file prior to deduplication, storage system 104 improves the performance of deduplication since hashes of the same data segments will be the same even though they were encrypted by the backup client using a different encryption algorithm, key, seed, etc., during each backup.

In one embodiment, storage system 104 re-encrypts the deduplicated data segments prior to storing them on storage, such as storage 108-109. By re-encrypting the deduplicated data segments, storage system 104 improves deduplication performance without sacrificing data security. In one embodiment, the security key used for re-encrypting the deduplicated data segments is the same security key that is used to decrypt the incoming data. In an alternate embodiment, the security key used for re-encrypting the deduplicated data segments is different from the security key that is used to decrypt the incoming data. In such an embodiment, the security key used for re-encrypting the deduplicated data segments can be maintained locally by storage system 104. Alternatively, the security key used for re-encrypting the deduplicated data segments can be maintained by a remote security server such as security manager 420. In such an embodiment, at transaction 9, storage system 104 requests security manager 420 for a security key identified by a key ID that is different from the key ID that identifies security key used for decrypting the incoming data. As illustrated, storage system 104 requests security manager 420 for a security key identified by key ID 2. In one embodiment, the same security key is used for re-encrypting all deduplicated data segments of all incoming files. Alternatively, a different security key may be used for re-encrypting the deduplicated data segments of each incoming file. In such an embodiment, the key ID and seed can be stored as part of security information 214 (not shown).

At transaction 10, security manager 420 sends storage system 104 a security key identified by the received key ID. As illustrated, security manager 420 sends security key 2 to storage system 104. At transaction 11, storage system 104 encrypts the deduplicated data segments using the received key. As illustrated, storage system 104 encrypts the deduplicated segments using key 2 and seed 2. At transaction 12, storage system 104 stores the encrypted data segments in storage units, e.g., storage units 108-109.

FIG. 4B illustrates the transactions that are performed by storage system 104 when backing up the same data file that has been previously backed up. At transaction 1, client 401 decides to perform a second backup of the same file that was previously backed up, for example, as part of the transactions illustrated in FIG. 4A. At transaction 2, client 401 decides to encrypt the backup file, and sends a request to security manager 420 for a security key. At transaction 3, security manager 420 sends key 3 to client 401. At transaction 4, client 401 encrypts the backup file with key 3 and seed 3, and sends the encrypted file to storage system 104. In one embodiment, the encrypted file includes the data to be backed up and a corresponding key ID and seed that were used to encrypt the data. FIG. 5 illustrates the format of encrypted files according to one embodiment. As illustrated in FIG. 4B, the encrypted file includes key ID 3 and seed 3.

Referring now back to FIG. 4B. At transaction 5, in response to receiving the backup file, storage system 104 (e.g., security module 116 of storage system 104) determines that the backup file is encrypted, and parses the file to access the key ID and seed of the encrypted file. For example, storage system 104 parses the received encrypted file and accesses key ID 3 and seed 3. Storage system 104 then sends a request to security manager 420 for a security key to decrypt the backup file. In one embodiment, storage system 104 sends the key ID corresponding to the encrypted data as part of the request. For example, as illustrated, storage system 104 sends key ID 3 which identifies key 3 that was used to encrypt the backup file.

At transaction 6, security manager 420 uses the received key ID to identify the security key that was used to encrypt the encrypted data, and sends the identified security key to storage system 104. As illustrated, security manager 420 sends key 3 to storage system 104. At transaction 7, security module 116 uses the received security key and seed (e.g., key 3 and seed 3) to decrypt the encrypted file.

In one embodiment, storage system 104 stores the key ID and seed that are accessed from the received encrypted file as part of security information 214. For example, received key ID 3 may be stored as part of key ID field 203 and received seed 3 may be stored as part of seed field 204. The information stored in security information 214 is used by storage system 104 for restoring the backup files when requested by the backup client, which is discussed in further details below.

At transaction 8, storage system 104 deduplicates the decrypted incoming file. By decrypting the incoming file prior to deduplication, storage system 104 improves the performance of deduplication since hashes of the same data segments will be the same even though they were encrypted by the backup client using a different encryption algorithm, key, seed, etc. during each backup.

In one embodiment, storage system 104 re-encrypts the deduplicated data segments prior to storing them on storage, such as storage 108-109. By re-encrypting the deduplicated data segments, storage system 104 improves deduplication performance without sacrificing data security. In one embodiment, the security key used for re-encrypting the deduplicated data segments is the same security key that is used to decrypt the incoming data. In an alternate embodiment, the security key used for re-encrypting the deduplicated data segments is different from the security key that is used to decrypt the incoming data. In such an embodiment, the security key used for re-encrypting the deduplicated data segments can be maintained locally by storage system 104. Alternatively, the security key used for re-encrypting the deduplicated data segments can be maintained by a remote security server such as security manager 420. In such an embodiment, at transaction 9, storage system 104 requests security manager 420 for a security key identified by a key ID that is different from the key ID that identifies security key used for decrypting the incoming data. As illustrated, storage system 104 requests security manager 420 for a security key identified by key ID 4. In one embodiment, the same security key is used for re-encrypting all deduplicated data segments of all incoming files. Alternatively, a different security key may be used for re-encrypting the deduplicated data segments of each incoming file. In such an embodiment, the key ID can be stored as part of security information 214 (not shown).

At transaction 10, security manager 420 sends storage system 104 a security key identified by the received key ID. As illustrated, security manager 420 sends security key 4 to storage system 104. At transaction 11, storage system 104 encrypts the deduplicated data segments using the received key. As illustrated, storage system 104 encrypts the deduplicated segments using key 4 and seed 4. At transaction 12, storage system 104 stores the encrypted data segments in storage units, e.g., storage units 108-109.

FIG. 4C is a block diagram illustrating the transactions performed by storage system 104 in response to receiving a request to restore a backup file, according to one embodiment. The transactions of FIG. 4C assume that at least some of the transactions of FIG. 4B have been performed. Referring now to FIG. 4C, at transaction 1, client 401 decides to restore a file that has been previously backed up by storage system 104, and sends a request to storage system 104 to restore the file. At transaction 2, in response to the request, storage system 104 retrieves the data segments corresponding to the requested file from storage. In one embodiment, storage system 104 determines that the deduplicated data segments are encrypted.

In one embodiment, the security key used for decrypting the deduplicated data segments are maintained locally (e.g., by security module 116 of storage system 104). Alternatively, the security key can be maintained by a remote security server. In such an embodiment, at transaction 3, storage system 104 determines the key ID and seed corresponding to the encrypted data segments and sends the key ID and seed as part of a request for a security key to security manager 420. At transaction 4, security manager 420 identifies the security key corresponding to the received key ID, and sends the identified security key to storage system 104. In one embodiment, the key ID and seed associated with the encrypted deduplicated data segments are stored locally at storage system 104, for example, as part of security information 214 (not shown).

At transaction 5, storage system 104 decrypts the data segments using a security key (e.g., security key received from security manager 420) and a seed. In this example, storage system 104 uses key 4 and seed 4 to decrypt the data segments because key 4 and seed 4 were used to encrypt the data segments at transaction 11 of FIG. 4B.

At transaction 6, storage system 104 generates the requested backup file using the decrypted data segments. In one embodiment, storage system 104 determines that the requested file was encrypted when it was backed up. This determination can be made, for example, based on the metadata associated with the requested file. In such an embodiment, storage system 104 determines a key ID and seed based on the associated metadata (e.g., by accessing key ID field 203 and seed field 204 of the entry in security information 204 that corresponds to the requested file). In such an embodiment, at transaction 7, storage system 104 sends the determined key ID as part of a request for a security key to security manager 420. As illustrated, key ID 3 is sent as part of the request because key ID 3 identifies key 3 which was used to encrypt the incoming file as part of the transactions of FIG. 4B.

At transaction 8, security manager 420 identifies a security key that corresponds to the received key ID. As illustrated, security manager 420 identifies key 3 as corresponding to key ID 3, and sends key 3 to storage system 104. At transaction 9, storage system 104 encrypts the requested file using the received key. As illustrated, key 3 and seed 3 are used to encrypt the requested file. At transaction 10, storage system 104 sends the encrypted requested file to backup client 104.

Figure 6:
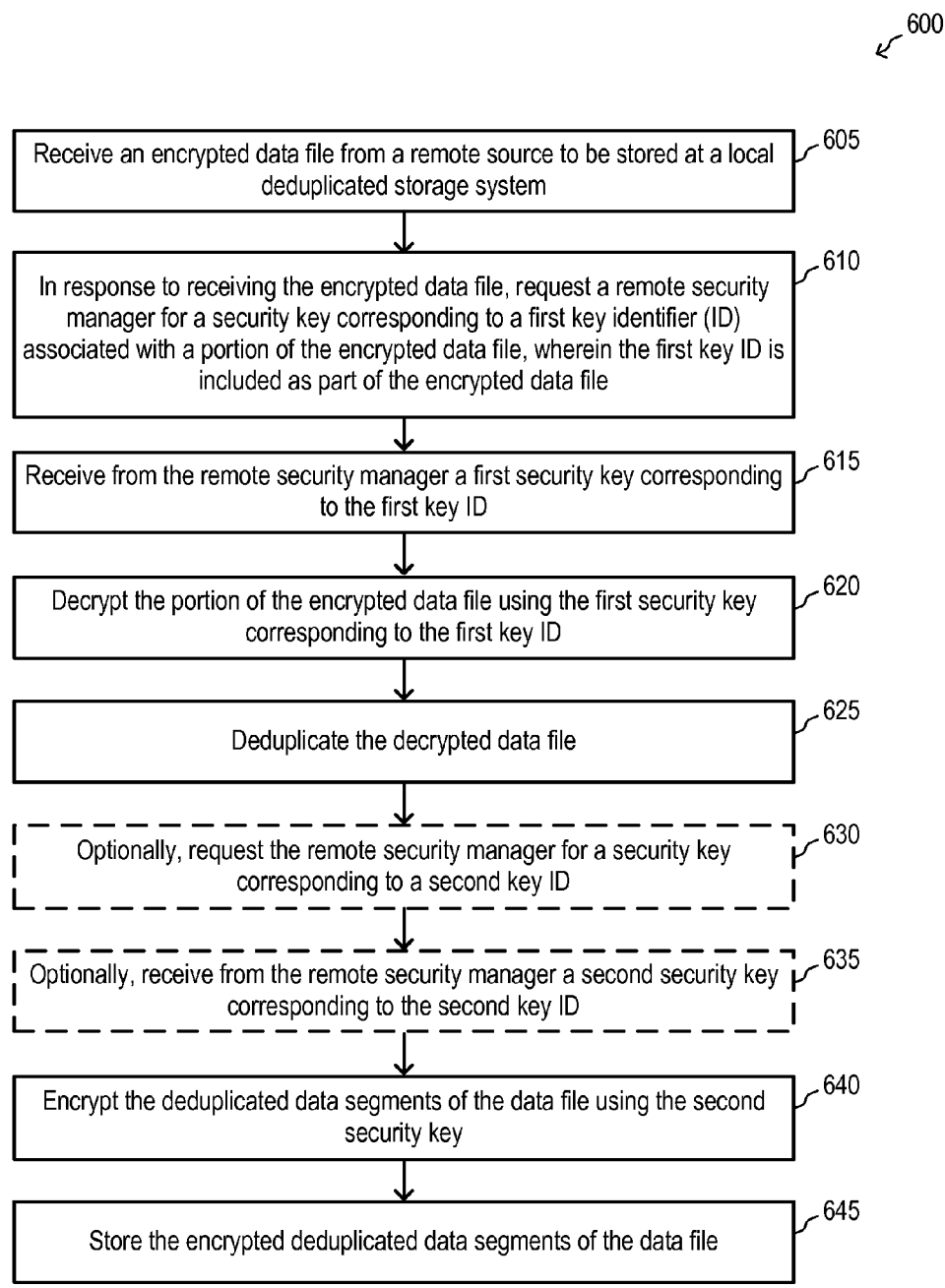
FIG. 6 is a flow diagram illustrating a method for deduplicating an encrypted backup file according to one embodiment.

FIG. 6 is a flow diagram illustrating method 600 for deduplicating encrypted backup files according to one embodiment. For example, method 600 can be performed by storage system 104 (such as security module 116 of storage system 104), which can be implemented as software, firmware, hardware, or any combination thereof. Method 600 will now be discussed with reference to previously discussed figures. Referring now to FIG. 6, at block 605, the storage system receives an encrypted data file from a remote source to be stored at the local deduplicated storage system (e.g., as part of transaction 4 of FIG. 4B).

At block 610, in response to receiving the encrypted data file, the storage system sends a request to a remote security manager (e.g., as part of transaction 5 of FIG. 4B) requesting for a security key corresponding to a first key ID associated with the encrypted data file, wherein the first key ID is included as part of the encrypted file (e.g., as illustrated in FIG. 5).

At block 615, the storage system receives from the remote security manager a first security key corresponding to the first key ID (e.g., as part of transaction 6 of FIG. 4B). At block 620, the storage system decrypts the encrypted data file using the first security key corresponding to the first key ID (e.g., as part of transaction 7 of FIG. 4B).

At block 625, the storage system deduplicates the decrypted data file (e.g., as part of transaction 8 of FIG. 4B). In one embodiment, the deduplicated data segments are re-encrypted prior to being stored on the storage units. In one embodiment, the security key used for encrypting the deduplicated data segments is maintained locally. Alternatively, the security key is maintained at a remote security server. In such an embodiment, at block 630, the storage system requests the remote security server for a security key corresponding to a second key ID (e.g., as part of transaction 9 of FIG. 4B).

At block 635, the storage system receives from the remote security manager a second security key corresponding to the second key ID. At block 640, the storage system encrypts the deduplicated data segments of the data file using the second security key (e.g., as part of transaction 11 of FIG. 4B). In one embodiment, the key ID identifying the security key for encrypting the deduplicated data segments and the seed are stored locally, for example, as part of security information 214 (not shown). At block 645, the storage system stores the encrypted deduplicated data segments of the data file (e.g., as part of transaction 12 of FIG. 4B).

Figure 7:
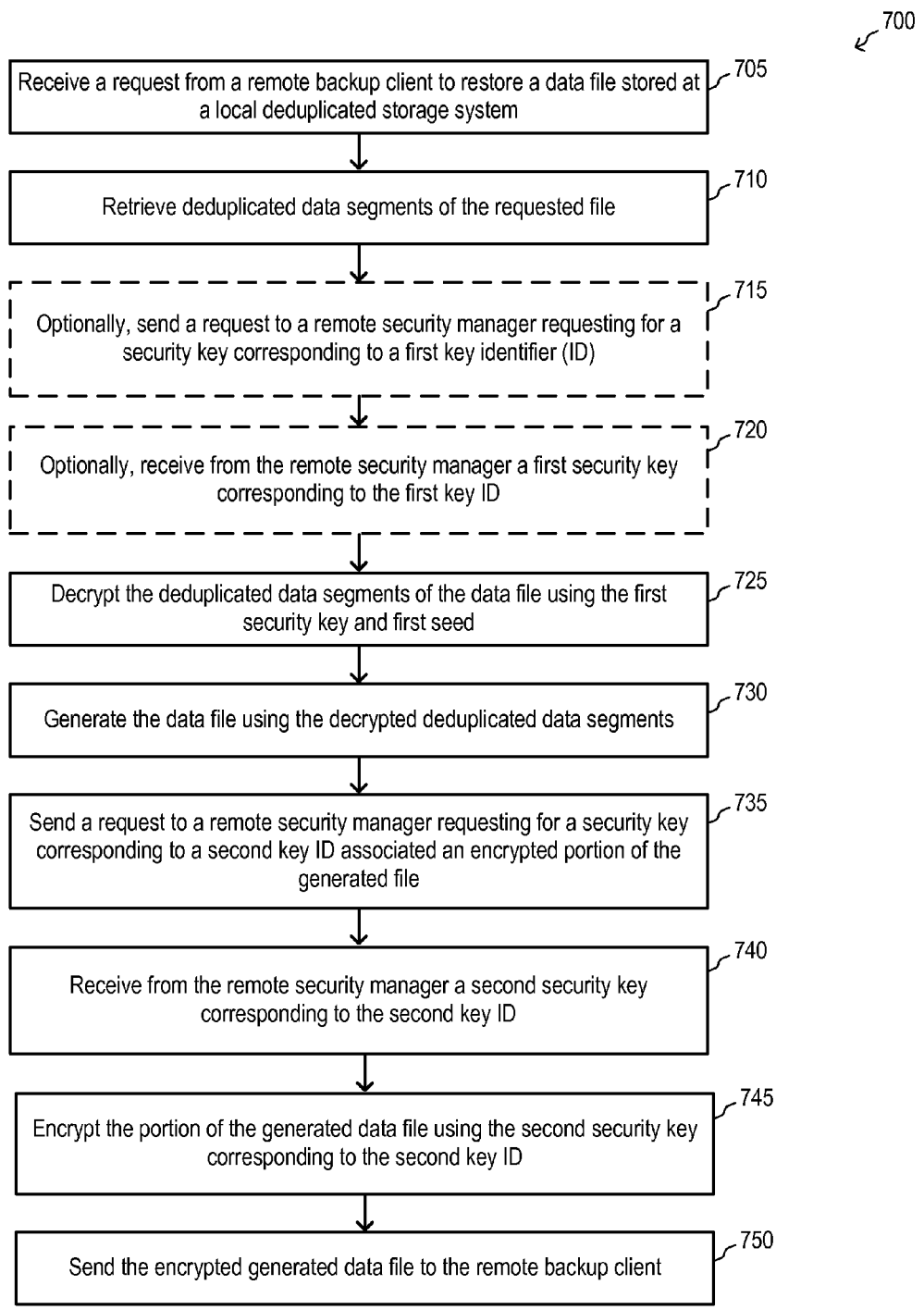
FIG. 7 is a flow diagram illustrating a method for restoring an encrypted backup file according to one embodiment.

FIG. 7 is a flow diagram illustrating method 700 for restoring an encrypted backup file according to one embodiment. For example, method 700 can be performed by storage system 104 (such as security module 116 of storage system 104), which can be implemented as software, firmware, hardware, or any combination thereof. Method 700 will now be discussed with reference to previously discussed figures. Referring now to FIG. 7, at block 705, the storage system receives a request from a remote backup client to restore a data file (e.g., as part of transaction 1 of FIG. 4C) that has been backed up at the local deduplicated storage system.

At block 710, the storage system retrieves from storage the deduplicated data segments of the requested file. In one embodiment, the deduplicated data segments are encrypted. In such an embodiment, the security key for decrypting the deduplicated data segments can be maintained locally at the storage system, or alternatively, at a remote security server. In an embodiment where the security key for decrypting the deduplicated data segments is maintained at a remote security server, at block 715, the storage system sends a request to a remote security manager (e.g., as part of transaction 3 of FIG. 4C) requesting for a security key corresponding to a first key ID.

At block 720, the storage system receives from the security manager (e.g., as part of transaction 4 of FIG. 4C) a first security key corresponding to the first key ID. At block 725, the storage system decrypts the deduplicated data segments of the requested data file using the first security key and first seed (e.g., as part of transaction 5 of FIG. 4C). At block 730, the storage system generates the requested backup file using the decrypted deduplicated data segments (e.g., as part of transaction 6 of FIG. 4C). At block 735, the storage system sends a request to the remote security manager requesting for a security key corresponding to a second key ID associated with an encrypted generated file (e.g., as part of transaction 7 of FIG. 4C). At block 740, the storage system receives from the remote security manager a second security key corresponding to the second key ID (e.g., as part of transaction 8 of FIG. 4C). At block 745, the storage system encrypts the generated backup file using the second security key (e.g., as part of transaction 9 of FIG. 4C). At block 750, the storage system sends the encrypted generated file to the backup client (e.g., as part of transaction 10 of FIG. 4C).

FIGS. 8A-8B are block diagrams illustrating storage systems 800-801, respectively, according to one embodiment. Systems 800-801 include storage system 104 communicatively coupled to client 401, which is communicatively coupled to security manager 420. FIGS. 8A-8B illustrate the same file being backed up twice to storage system 104. The first backup is performed during the transactions illustrated in FIG. 8A, and the second backup of the same file is performed during the transactions illustrated in FIG. 8B.

Referring now to FIG. 8A, which illustrates the transactions that are performed by storage system 104 when backing up a data file, according to one embodiment. At transaction 1, client 401 decides to perform a first backup of a file. At transaction 2, client 401 decides to encrypt the backup file, and sends a request to security manager 420 for a security key. At transaction 3, security manager 420 sends key 1 to client 401. At transaction 4, client 401 encrypts the backup file with key 1 and seed 1, and sends the encrypted file to storage system 104.

In one embodiment, the encrypted file includes the data to be backed up and a corresponding key ID and seed that were used to encrypt the data. FIG. 5 illustrates encrypted file 501 according to one embodiment. As illustrated, encrypted file 501 includes data 513 which represents the encrypted data that is to be backed up. Encrypted file 501 further includes key ID 511 and seed 512 that were used by the backup client in encrypting data 513.

Referring now back to FIG. 8A. At transaction 5, in response to receiving the backup file, storage system 104 (e.g., security module 116 of storage system 104) determines that the backup file is encrypted, and parses the file to access the key ID and seed of the encrypted file. Security module 116 then sends a request to security manager 420 for a security key to decrypt the backup file. In one embodiment, storage system 104 sends the key ID corresponding to the encrypted data as part of the request. At transaction 6, security manager 420 uses the received key ID to identify the security key that was used to encrypt the encrypted data, and sends the identified security key to storage system 104. At transaction 7, storage system 104 uses the received security key and seed to decrypt the encrypted file. As illustrated, storage system uses key 1 and seed 1 to decrypt the encrypted file.

At transaction 8, storage system 104 deduplicates the decrypted incoming file. By decrypting the incoming file prior to deduplication, storage system 104 improves the performance of deduplication since hashes of the same data segments will be the same even though they were encrypted by the backup client using a different encryption algorithm, key, seed, etc. during each backup. At transaction 9, storage system 104 re-encrypts the deduplicated data segments prior storing them on storage, such as storage 109-109. In one embodiment, storage system 104 uses the same security key that was received from security manager 420 to re-encrypt the deduplicated data segments. As illustrated in FIG. 8A, key 1 is used for both decrypting the incoming file and re-encrypting the deduplicated data segments of the decrypted incoming file. By re-encrypting the deduplicated data segments, storage system 104 improves deduplication performance without sacrificing data security. At transaction 10, the storage system stores the encrypted deduplicated data segments on storage (e.g., storage units 108-109).

In one embodiment, storage system 104 stores the key IDs and seeds that are accessed from the received encrypted file as part of security information 214. For example, received key ID 1 may be stored as part of key ID field 203 and received seed 1 may be stored as part of seed field 204. The information stored in security information 214 is used by storage system 104 for restoring the backup files when requested by the backup client, which is discussed in further details below.

FIG. 8B illustrates the transactions that are performed by storage system 104 when backing up the same data file that has been previously backed up. At transaction 1, client 401 decides to perform a second backup of the same file that was previously backed up, for example, as part of the transactions illustrated in FIG. 8A. At transaction 2, client 401 decides to encrypt the backup file, and sends a request to security manager 420 for a security key. At transaction 3, security manager 420 sends key 2 to client 401. At transaction 4, client 401 encrypts the backup file with key 2 and seed 2, and sends the encrypted file to storage system 104. In one embodiment, the encrypted file includes the data to be backed up and a corresponding key ID and seed that were used to encrypt the data. FIG. 5 illustrates the format of encrypted files according to one embodiment.

Referring still to FIG. 8B. At transaction 5, in response to receiving the backup file, storage system 104 (e.g., security module 116 of storage system 104) determines that the backup file is encrypted, and parses the file to access the key ID and seed of the encrypted file. Storage system 104 then sends a request to security manager 420 for a security key to decrypt the backup file. In one embodiment, storage system 104 sends the key ID corresponding to the encrypted data as part of the request. As illustrated, storage system sends key ID 2 as part of the request. At transaction 6, security manager 420 uses the received key ID to identify the security key that was used to encrypt the encrypted data, and sends the identified security key to storage system 104. As illustrated, security manager 420 sends key 2 to storage system 104 as part of transaction 6. At transaction 7, storage system 104 uses the received security key and seed to decrypt the encrypted file.

At transaction 8, storage system 104 deduplicates the decrypted incoming file. By decrypting the incoming file prior to deduplication, storage system 104 improves the performance of deduplication since hashes of the same data segments will be the same even though they were encrypted by the backup client using a different encryption algorithm, key, seed, etc. during each backup. At transaction 9, storage system 104 encrypts the deduplicated data segments prior storing them on storage, such as storage 109-109. In one embodiment, storage system 104 uses the same security key that was received from security manager 420 to encrypt the deduplicated data segments. As illustrated in FIG. 8B, key 2 is used for both decrypting the incoming file and re-encrypting the deduplicated data segments of the decrypted incoming file. By re-encrypting the deduplicated data segments, storage system 104 improves deduplication performance without sacrificing data security. At transaction 10, the storage system stores the encrypted deduplicated data segments on storage (e.g., storage units 108-109).

In one embodiment, storage system 104 stores the key ID and seed that are accessed from the encrypted file as part of security information 214. For example, received key ID 2 may be stored as part of key ID field 203 and received seed 2 may be stored as part of seed field 204.

Figure 8C:
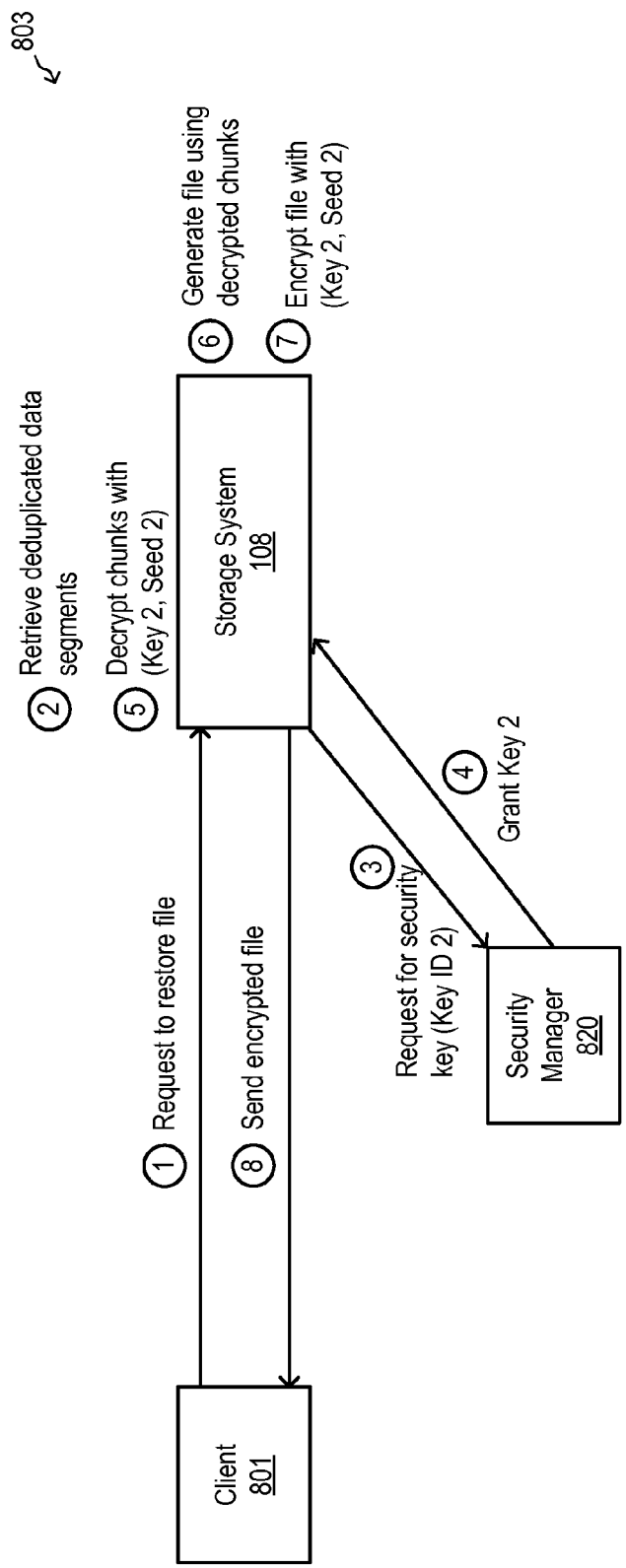
FIG. 8C is a block diagram illustrating a storage system according to one embodiment.

FIG. 8C is a block diagram illustrating the transactions performed by storage system 104 in response to receiving a request to restore a backup file, according to one embodiment. The transactions of FIG. 8C assume that at least some of the transactions of FIG. 8B have been performed. Referring now to FIG. 8C, at transaction 1, client 401 decides to restore a file that has been previously backed up by storage system 104, and sends a request to storage system 104 to restore the file. At transaction 2, in response to the request, storage system 104 retrieves the data segments corresponding to the requested file from storage. In one embodiment, storage system 104 determines that the deduplicated data segments are encrypted. In such an embodiment, storage system 104 determines the key ID and seed corresponding to the encrypted data segments based on the metadata of the data segments. For example, storage system 104 looks up an entry in security information 214 corresponding to the encrypted data segments and accesses key ID field 203 and seed field 204 of the entry.

At transaction 3, storage system 104 requests security manager 420 for a security key associated with the determined key ID. At transaction 4, security manager 420 sends storage system 104 the security key corresponding to the key ID. At transaction 5, storage system 104 decrypts the data segments using the security key received from security manager 420 and the seed from security information 214. In this example, storage system 104 uses key 2 and seed 2 to decrypt the data segments because key 2 and seed 2 were used to encrypt the data segments at transaction 9 of FIG. 8B.

At transaction 6, storage system 104 generates the requested backup file using the decrypted data segments. At transaction 7, storage system 104 encrypts the generated file. In one embodiment, the security key and seed that are used to encrypt the generated file are the same security key and seed that are used to decrypt the deduplicated data segments at transaction 5. At transaction 8, storage system 104 sends the encrypted generated file to client 104.

Figure 9:
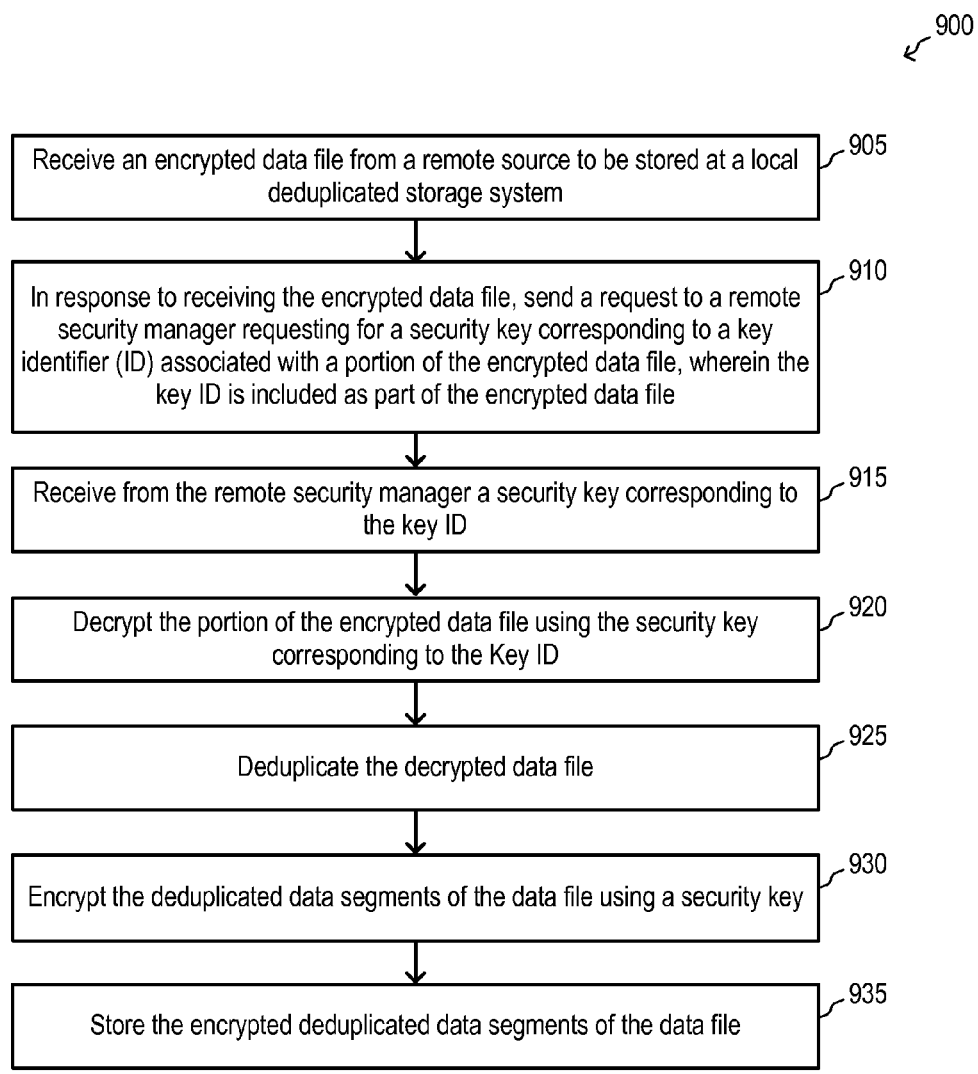
FIG. 9 is a flow diagram illustrating a method for deduplicating an encrypted backup file according to one embodiment.

FIG. 9 is a flow diagram illustrating method 900 for deduplicating encrypted backup files according to one embodiment. For example, method 900 can be performed by storage system 104 (such as security module 116 of storage system 104), which can be implemented as software, firmware, hardware, or any combination thereof. Method 900 will now be discussed with reference to previously discussed figures. Referring now to FIG. 9, at block 905, the storage system receives an encrypted data file from a remote source to be stored at the local deduplicated storage system (e.g., as part of transaction 4 of FIG. 8B).

At block 910, in response to receiving the encrypted data file, the storage system sends a request to a remote security manager (e.g., as part of transaction 5 of FIG. 8B) requesting for a security key corresponding to a key ID associated with the encrypted data file, wherein the key ID is included as part of the encrypted file (as illustrated in FIG. 5).

At block 915, the storage system receives from the remote security manager a security key corresponding to the key ID (e.g., as part of transaction 6 of FIG. 8B). At block 920, the storage system decrypts the encrypted data file using the security key corresponding to the key ID (e.g., as part of transaction 7 of FIG. 8B).

At block 925, the storage system deduplicates the decrypted data file (e.g., as part of transaction 8 of FIG. 8B). At block 930, the storage system encrypts the deduplicated data segments of the data file using a security key (e.g., as part of transaction 9 of FIG. 8B). In one embodiment, the security key used for re-encrypting the deduplicated data segments is the same key that is used to decrypt the incoming file (i.e., the security key received as part of block 915). At block 935, the storage system stores the encrypted deduplicated data segments of the data file (e.g., as part of transaction 10 of FIG. 8B).

Figure 10:
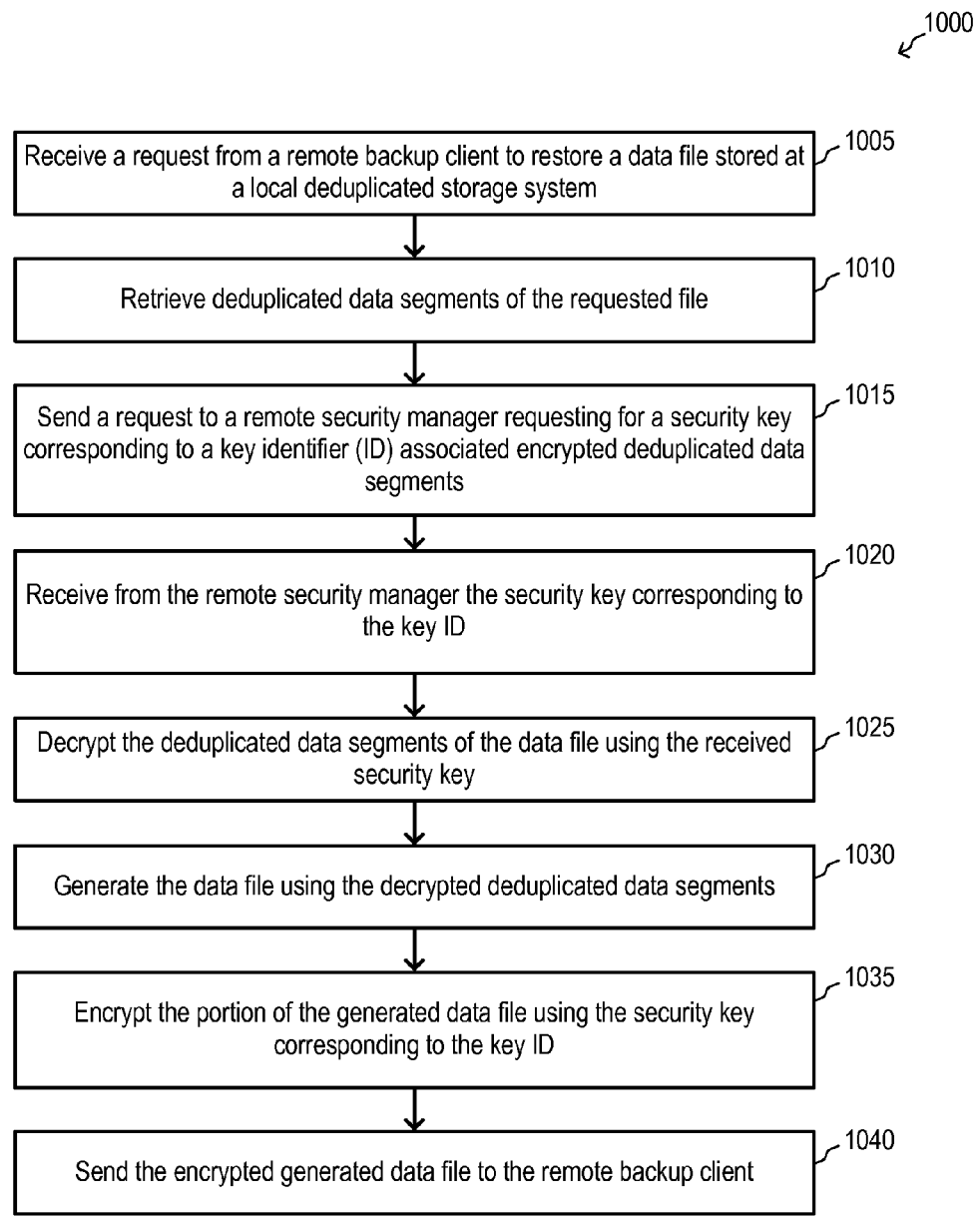
FIG. 10 is a flow diagram illustrating a method for restoring an encrypted backup file according to one embodiment.

FIG. 10 is a flow diagram illustrating method 1000 for restoring an encrypted backup file according to one embodiment. For example, method 1000 can be performed by storage system 104 (such as security module 116 of storage system 104), which can be implemented as software, firmware, hardware, or any combination thereof. Method 1000 will now be discussed with reference to previously discussed figures. Referring now to FIG. 10, at block 1005, the storage system receives a request from a remote backup client to restore a data file (e.g., as part of transaction 1 of FIG. 8C) that has been backed up at the local deduplicated storage system.

At block 1010, the storage system retrieves from storage the deduplicated data segments of the requested file. At block 1015, in response to determining the deduplicated data segments are encrypted based on the metadata (e.g., security information 214 of the metadata), the storage system sends a request to a remote security manager requesting for a security key corresponding to a key ID associated with the encrypted deduplicated data segments. For example, the storage system accesses key ID field 203 of the entry corresponding to the deduplicated data segments and sends the key ID as part of the request to the remote security key manager (e.g., as part of transaction 3 of FIG. 8C).

At block 1020, the storage system receives from the remote security manager the security key corresponding to the key ID (e.g., as part of transaction 4 of FIG. 8C). At block 1025, the storage system decrypts the deduplicated data segments of the data file using the security key received from the security manager (e.g., as part of transaction 5 of FIG. 8C). At block 1030, the storage system generates the requested backup file using the decrypted deduplicated data segments (e.g., as part of transaction 6 of FIG. 8C).

At block 1035, the storage system encrypts the generated backup file using a security key. In one embodiment, the security key used for encrypting the generated file is the same security key received as part of block 1020. At block 1040, the storage system sends the encrypted generated file to the remote backup client that requested for the file (e.g., as part of transaction 8 of FIG. 8C).

Figure 11:
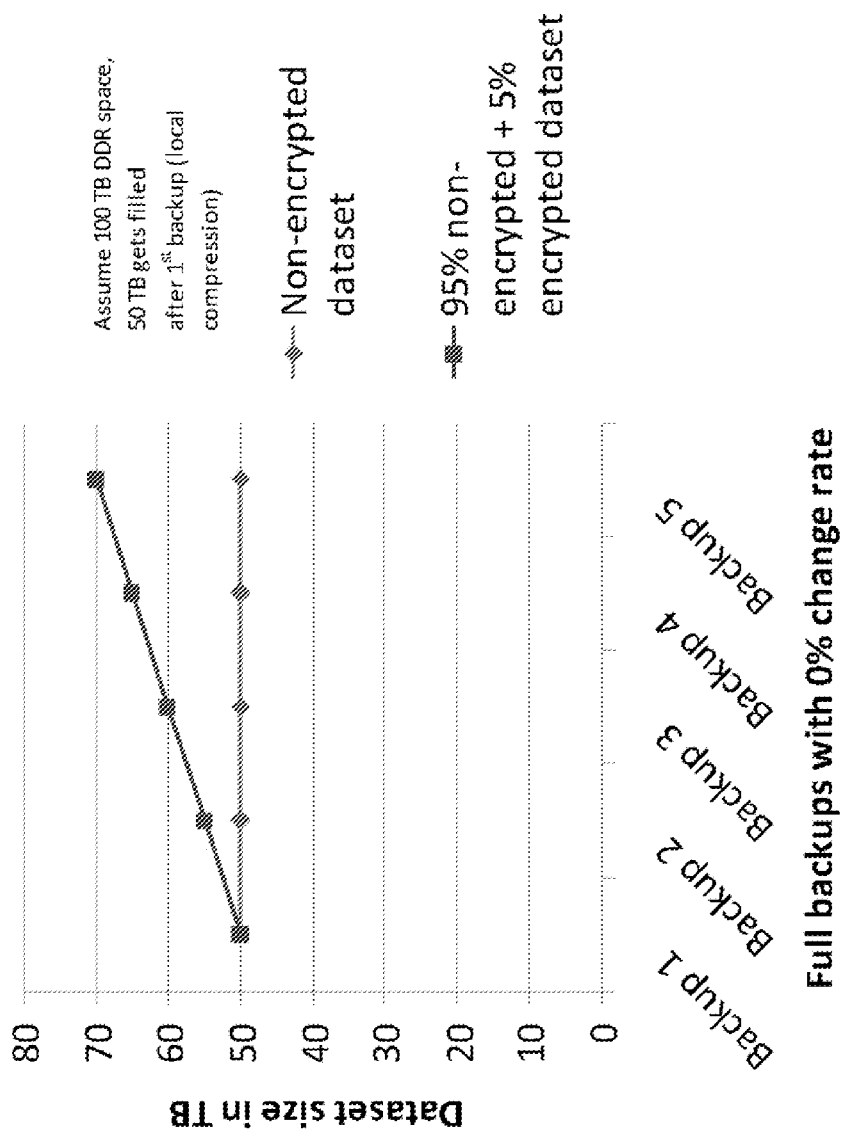
FIG. 11 is a diagram illustrating the effect of deduplicating encrypted backup files.

FIG. 11 is a diagram illustrating the effect on remaining storage space of a deduplicated storage system when the storage system ingests encrypted backup data. The diagram assumes the storage system has the storage capacity of 100 terabyte (TB). As illustrated, the deduplication engine of the storage system performs compression after deduplication. After the first backup, 50 TB is used because there is no deduplication for the first backup and local compression reduces the space requirement by half. In the case where the storage system is ingesting only non-encrypted data, there would be perfect deduplication if there is no change in data across all subsequent backups. However, if the appliance is ingesting 5% encrypted data along with 95% non-encrypted data, the remaining storage space on the storage system decreases linearly with the increase in encrypted data. In other words, for each subsequent backup with 5% encrypted data, the remaining storage space decreases by 5%, even though the backup data has not changed for each subsequent backup.

Figure 12:
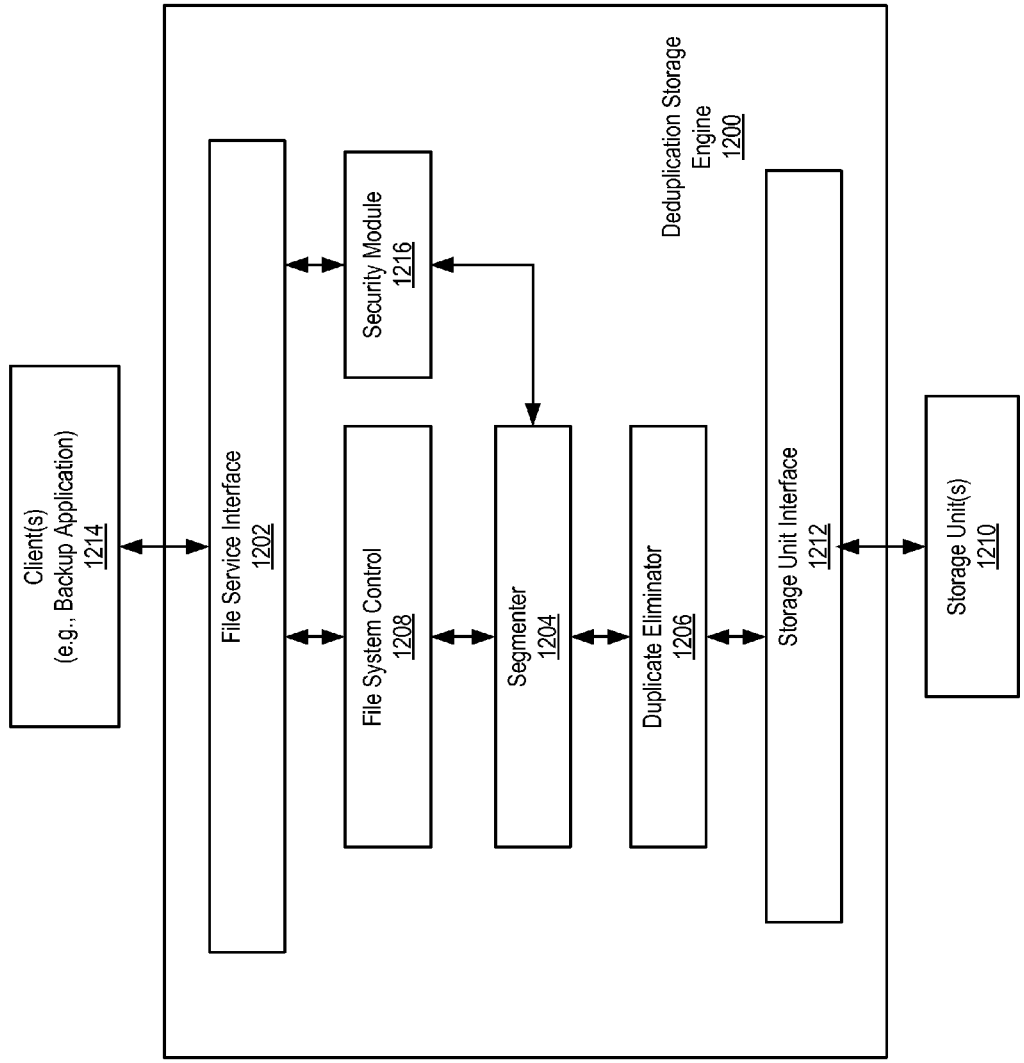
FIG. 12 is a block diagram illustrating a deduplication storage system according to one embodiment.

FIG. 12 is a block diagram illustrating a chunk storage engine according to one embodiment of the invention. For example, deduplication storage engine 1200 may be implemented as part of a deduplication storage system as described above, such as deduplication storage engine 107 of FIG. 1. Referring to FIG. 12, in one embodiment, deduplication storage engine 1200 includes file service interface 1202, security module 1216, segmenter 1204, duplicate eliminator 1206, file system control 1208, and storage unit interface 1212. Deduplication storage engine 1200 receives a file or files (or data item(s)) via file service interface 1202, which may be part of a file system namespace of a file system associated with the deduplication storage engine 1200. The file system namespace refers to the way files are identified and organized in the system. An example is to organize the files hierarchically into directories or folders. File service interface 1212 supports a variety of protocols, including a network file system (NFS), a common Internet file system (CIFS), and a virtual tape library interface (VTL), etc.

In one embodiment, encrypted files are decrypted by security module 1216 prior to deduplication. The decrypted file(s) is/are processed by segmenter 1204 and file system control 1208. Segmenter 1204 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1208 processes information to indicate the chunk(s) association with a file. In some embodiments, a list of fingerprints is used to indicate chunk(s) associated with a file. File system control 1208 passes chunk association information (e.g., representative data such as a fingerprint) to an index (not shown). The index is used to locate stored chunks in storage units 1210 via storage unit interface 1212. Duplicate eliminator 1206 identifies whether a newly received chunk has already been stored in storage units 1210. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1210 that make up the file. Chunks are then packed by a container manager (not shown) into one or more storage containers stored in storage units 1210. The deduplicated chunks may be further compressed using a variation of compression algorithms, such as a Lempel-Ziv algorithm before being stored.

When a file is to be retrieved, file service interface 1202 is configured to communicate with file system control 1208 to identify appropriate chunks stored in storage units 1210 via storage unit interface 1212. Storage unit interface 1212 may be implemented as part of a container manager. File system control 1208 communicates with an index (not shown) to locate appropriate chunks stored in storage units via storage unit interface 1212. Appropriate chunks are retrieved from the associated containers via the container manager and are used to construct the requested file. The file is provided via interface 1202 in response to the request. In one embodiment, file system control 1208 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

An electronic device (e.g., a computer, an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for deduplicating encrypted data, the method comprising:
   receiving a first data file from a remote source to be stored at a local deduplicated storage system by a backup and restore (backup/restore) engine executed by a processor of the local deduplicated storage system, wherein the first data file is encrypted by a first security key;
   transmitting by a security module of the backup/restore engine to a remote security manager a first key identifier (ID) that is extracted from the first data file, the first key ID identifying the first security key, wherein the remote security manager is hosted by a remote server separated from the remote source and the local deduplicated storage system;
   in response to receiving the first security key from the remote security manager based on the first key ID, decrypting by the security module the first data file using the first security key provided by the remote security manager;
   deduplicating the decrypted first data file by a deduplication storage engine executed by the processor of the local deduplicated storage system, wherein deduplicating the decrypted first data file comprises partitioning the decrypted first data file into a plurality of data segments;
      generating a hash for each of plurality of data segments,
      comparing the generated hashes with hashes of data segments already stored at the local deduplicated storage system, and
      determining one or more deduplicated data segments of the first data file, wherein the deduplicated data segments of the first data file are data segments with hashes that do not match the hashes of data segments already stored at the local deduplicated storage system;
   encrypting the deduplicated data segments of the first data file using a second security key; and
   storing the encrypted deduplicated data segments of the first data file.

2. The method of claim 1, wherein the first and second security keys are different.

3. The method of claim 2, further comprising:
   decrypting, in response to a request to restore the first data file, the stored deduplicated data segments of the first data file using the second security key.

4. The method of claim 3, further comprising:
   generating the first data file using the decrypted deduplicated data segments of the first data file.

5. The method of claim 4, wherein generating the first data file comprises:
   encrypting the generated first data file using the first security key.

6. The method of claim 1, wherein the first and second security keys are the same.

7. A non-transitory computer-readable medium having computer instructions stored therein, which when executed by a processor, cause the processor to perform operations, the operations comprising:
   receiving a first data file from a remote source to be stored at a local deduplicated storage system by a backup and restore (backup/restore) engine executed by a processor of the local deduplicated storage system, wherein the first data file is encrypted by a first security key;
   transmitting by a security module of the backup/restore engine to a remote security manager a first key identifier (ID) that is extracted from the first data file, the first key ID identifying the first security key, wherein the remote security manager is hosted by a remote server separated from the remote source and the local deduplicated storage system;
   in response to receiving the first security key from the remote security manager based on the first key ID, decrypting by the security module the first data file using the first security key provided by the remote security manager;
   deduplicating the decrypted first data file by a deduplication storage engine executed by the processor of the local deduplicated storage system, wherein deduplicating the decrypted first data file comprises partitioning the decrypted first data file into a plurality of data segments;
      generating a hash for each of plurality of data segments,
      comparing the generated hashes with hashes of data segments already stored at the local deduplicated storage system, and
      determining one or more deduplicated data segments of the first data file, wherein the deduplicated data segments of the first data file are data segments with hashes that do not match the hashes of data segments already stored at the local deduplicated storage system;
   encrypting the deduplicated data segments of the first data file using a second security key; and
   storing the encrypted deduplicated data segments of the first data file.

8. The non-transitory computer-readable medium of claim 7, wherein the first and second security keys are different.

9. The non-transitory computer-readable medium of claim 8, wherein the operations further comprise:
   decrypting, in response to a request to restore the first data file, the stored deduplicated data segments of the first data file using the second security key.

10. The non-transitory computer-readable medium of claim 9, wherein the operations further comprise:
    generating the first data file using the decrypted deduplicated data segments of the first data file.

11. The non-transitory computer-readable medium of claim 10, wherein generating the first data file comprises:
    encrypting the generated first data file using the first security key.

12. The non-transitory computer-readable medium of claim 7, wherein the first and second security keys are the same.

13. A data processing system, comprising:
    a processor;

a network interface configured to receive a first data file from a remote source to be stored at a local deduplicated storage system, wherein the first data file is encrypted by a first security key;

a security module executed by the processor and coupled to the network interface, configured to transmit to a remote security manager a first key identifier (ID) that is extracted from the first data file, the first key ID identifying the first security key, and in response to receiving the first security key from the remote security manager based on the first key ID, decrypt the first data file using the first security key provided by the remote security manager, wherein the remote security manager is hosted by a remote server separated from the remote source and the local deduplicated storage system; and a deduplication storage engine executed by the processor and coupled to the security module, configured to deduplicate the decrypted first data file, including partitioning the decrypted first data file into a plurality of data segments;

generating a hash for each of plurality of data segments, comparing the generated hashes with hashes of data segments already stored at the local deduplicated storage system, and determining one or more deduplicated data segments of the first data file, wherein the deduplicated data segments of the first data file are data segments with hashes that do not match the hashes of data segments already stored at the local deduplicated storage system, wherein the security module encrypts the deduplicated data segments of the first data file using a second security key and stores the encrypted deduplicated data segments of the first data file.

14. The data processing system of claim 13, wherein the first and second security keys are different.

15. The data processing system of claim 14, wherein the security module is further configured to:

decrypt, in response to a request to restore the first data file, the stored deduplicated data segments of the first data file using the second security key.

16. The data processing system of claim 15, wherein the deduplication storage engine is further configured to:

generate the first data file using the decrypted deduplicated data segments of the first data file.

17. The data processing system of claim 16, wherein the security module is further configured to:

encrypt the generated first data file using the first security key.

18. The data processing system of claim 13, wherein the first and second security keys are the same.

* * * * *